(12) United States Patent
Abe et al.

(10) Patent No.: US 7,896,506 B2
(45) Date of Patent: Mar. 1, 2011

(54) IMAGE PROCESSING APPARATUS

(75) Inventors: Tsutomu Abe, Ashigarakami-gun (JP); Jun Shingu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 858 days.

(21) Appl. No.: 11/683,010

(22) Filed: Mar. 7, 2007

(65) Prior Publication Data

US 2008/0036897 A1    Feb. 14, 2008

(30) Foreign Application Priority Data

Aug. 9, 2006    (JP) .............................. 2006-217508

(51) Int. Cl.
    *G03B 21/14* (2006.01)
(52) U.S. Cl. .............................. 353/98; 353/7; 353/10; 353/65; 353/70; 353/71; 353/18; 353/46; 353/101; 353/102; 353/122; 348/208; 348/212; 348/214; 348/216; 348/267; 352/89; 352/47; 352/48; 352/88
(58) Field of Classification Search ............. 353/7, 353/10, 65, 98, 18, 46, 70, 71, 74, 101, 102, 353/122; 352/89, 47, 48, 88; 348/208, 212, 348/214, 216, 267, 318
See application file for complete search history.

(56) References Cited

U.S. PATENT DOCUMENTS

| | | | | |
|---|---|---|---|---|
| 3,634,004 A | * | 1/1972 | Howard ........................ 352/47 |
| 4,629,298 A | * | 12/1986 | Trumbull et al. .............. 353/30 |
| 4,796,990 A | * | 1/1989 | Crothers et al. ............... 352/89 |
| 4,847,693 A | * | 7/1989 | Eppolito ....................... 348/343 |
| 5,061,061 A | * | 10/1991 | Robley et al. ................. 352/89 |
| 5,400,095 A | * | 3/1995 | Minich et al. ................ 353/119 |
| 5,836,664 A | * | 11/1998 | Conner et al. ................. 353/70 |
| 5,961,195 A | * | 10/1999 | Yoshimatsu et al. .......... 353/98 |
| 2002/0001029 A1 | * | 1/2002 | Abe ............................. 348/49 |
| 2002/0021419 A1 | * | 2/2002 | Yoder et al. ................... 353/71 |
| 2004/0070674 A1 | | 4/2004 | Foote et al. |
| 2004/0141156 A1 | | 7/2004 | Beardsley et al. |

FOREIGN PATENT DOCUMENTS

| | | |
|---|---|---|
| CN | 1745397 A | 3/2006 |
| JP | 9-5663 A | 1/1997 |
| JP | 2005-33756 A | 2/2005 |

OTHER PUBLICATIONS

Chinese Office Action for Chinese Patent Application 200710091091.4 dated Jul. 17, 2009.

* cited by examiner

*Primary Examiner*—Georgia Y Epps
*Assistant Examiner*—Sultan Chowdhury
(74) *Attorney, Agent, or Firm*—Sughrue Mion, PLLC

(57) ABSTRACT

An image processing apparatus includes a first image pick-up unit, a projecting unit that projects imaging light, an optical unit that transmits part of light entering from a first image pick-up direction and guides the part of the light to the first image pick-up unit while reflecting part of the imaging light projected from the projecting unit and outputting the reflected light in the first image pick-up direction, and reflects part of light entering from a second image pick-up direction and guides the part of the light to the first image pick-up unit while transmitting part of the imaging light projected from the projecting unit and outputting the part of the imaging light in the second image pick-up direction, and an attenuating unit that is movably placed between two positions.

17 Claims, 9 Drawing Sheets

US 7,896,506 B2

IMAGE PROCESSING APPARATUS

BACKGROUND

1. Technical Field

The present invention relates to an image processing apparatus that has an image pick-up unit that picks up an image of an object, and a projecting unit that projects imaging light onto the image pick-up region of the image pick-up unit.

2. Related Art

There have been known techniques for sending instructions from a remote place with the use of images. By those techniques, an image of a predetermined region picked up by a camera is transmitted to a remote place, and an annotation image based on an instruction from the remote place is projected onto the image pick-up region of the camera by a projector.

In those techniques, the camera and the projector are housed in a casing and are shielded from external light, and the optical system of the camera and the optical system of the projector are designed to share the same optical axis with the help of a half mirror, so that each one of the image pick-up ranges of the camera corresponds to a projecting range.

In a case where the camera and the projector are housed in a casing, and the optical system of the camera and the optical system of the projector are designed to share the same optical axis with the help of a half mirror, as described above, the imaging light not to be used for projection among the imaging light emitted from the projector toward the half mirror might scatter as stray light in the casing and enter the camera. Therefore, a light attenuating member called a "trap" to absorb and attenuate the imaging light not to be used for projection is placed in such a position as to receive the imaging light not to be used for projection, as opposed to the half mirror.

SUMMARY

According to an aspect of the present invention, there is provided an image processing apparatus including: a first image pick-up unit; a projecting unit that projects imaging light; an optical unit that transmits part of light entering from a first image pick-up direction and guides the part of the light to the first image pick-up unit while reflecting part of the imaging light projected from the projecting unit and outputting the reflected light in the first image pick-up direction, and reflects part of light entering from a second image pick-up direction and guides the part of the light to the first image pick-up unit while transmitting part of the imaging light projected from the projecting unit and outputting the part of the imaging light in the second image pick-up direction; and an attenuating unit that is movably placed between a position in which imaging light transmitted through the optical unit can be received and a position in which imaging light reflected by the optical unit can be received, and attenuates the received imaging light.

BRIEF DESCRIPTION OF THE DRAWINGS

Exemplary embodiments of the present invention will be described in detail based on the following figures, wherein.

DETAILED DESCRIPTION

Figure 1A:
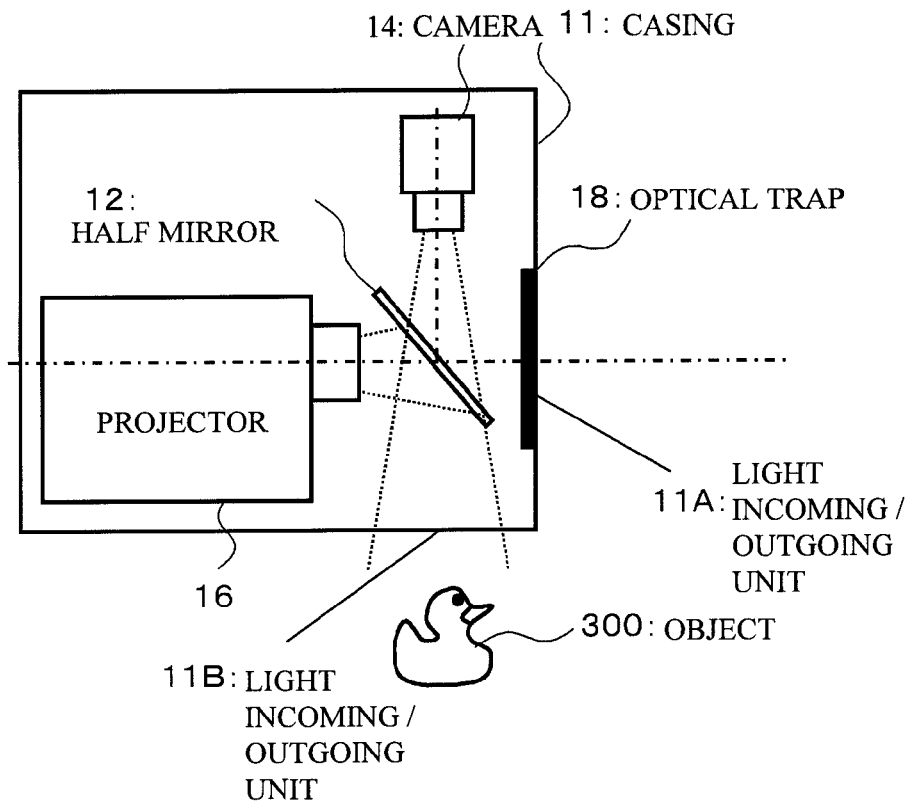
FIGS. 1A and 1B schematically show the structures of image processing units that are parts of image processing apparatuses.
Figure 1B:
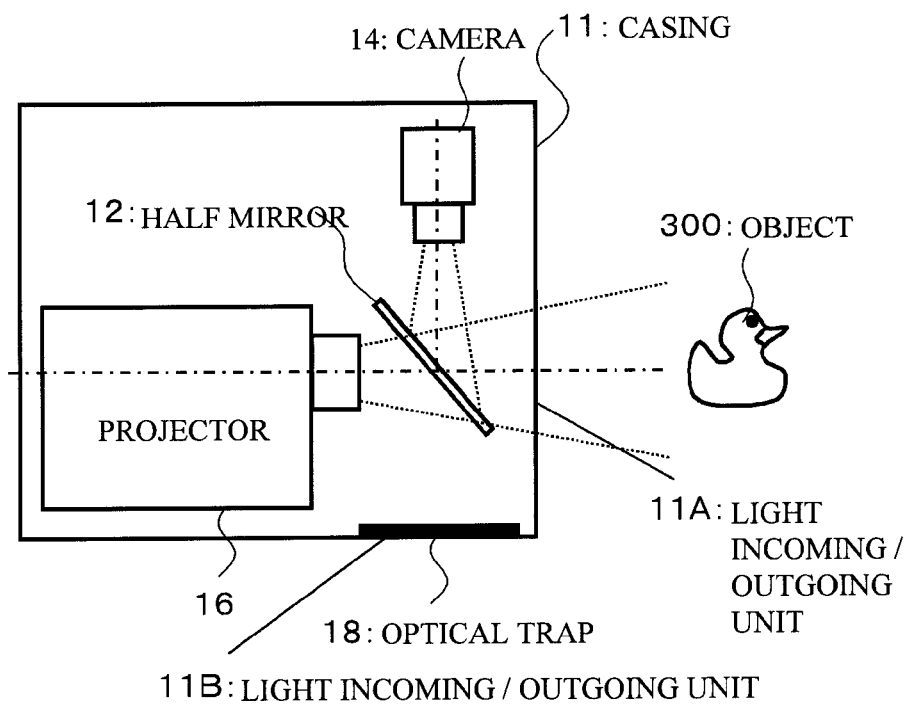

A description will now be given, with reference to the accompanying drawings, of exemplary embodiments of the present invention. FIGS. 1A and 1B schematically show the structures of image processing units that are parts of image processing apparatuses employed in this exemplary embodiment. Each of the image processing units 10 shown in FIGS. 1A and 1B picks up an image of an object 300, and projects the picked-up image. Each image processing unit 10 includes a half mirror 12 as an optical member, a camera 14 as a first image pick-up unit, a projector 16 as a projecting unit, an optical trap 18 as an attenuating unit, and a casing 11 that shields those components from external light.

The casing 11 includes a light incoming/outgoing unit 11A that allows incoming light in the horizontal direction and emits part of the light of the image projected from the projector 16, and a light incoming/outgoing unit 11B that allows incoming light from below and emits part of the light of the image projected from the projector 16. The optical trap 18 is selectively provided for the two light incoming/outgoing units 11A and 11B, and shields each of the light incoming/outgoing units 11A and 11B.

In FIGS. 1A and 1B, the half mirror 12 is located in a position within the image pick-up range of the camera 14 and within the projection range of the imaging light of the projector 16. The camera 14 pikes up an image of an object placed under the camera 14. In FIG. 1A, the camera 14 receives the light of the object 300 passing through the half mirror 12, and picks up the image of the object 300 placed on a floor or the like. In FIG. 1B, the camera 14 receives the light of the object 300 reflected by the half mirror 12, and picks up the image of the object 300 placed on a table or the like. Meanwhile, the projector 16 projects imaging light in the horizontal direction. The projector 16 projects the imaging light corresponding to an image obtained by the camera 14 onto a screen or the like (not shown) via the half mirror 12.

The optical trap 18 is of a movable type, and attenuates light. More specifically, in a case where the camera 14 receives the light of the object 300 passing through the half mirror 12 and picks up the image of the object 300, the optical trap 18 is located on a side face of the image processing unit 10, or on the line extending in the projecting direction of the projector 16, so as to prevent light unnecessary for the image pick-up from being reflected by the half mirror 12 and entering the camera 14. In a case where the camera 14 receives the light of the object 300 reflected by the half mirror 12 and picks up the image of the object 300, the optical trap 18 is located below the image processing unit 10, or on the line extending in the image pick-up direction of the camera 14, so as to prevent the unnecessary light from passing through the half mirror 12 and entering the camera 14.

Figure 2:
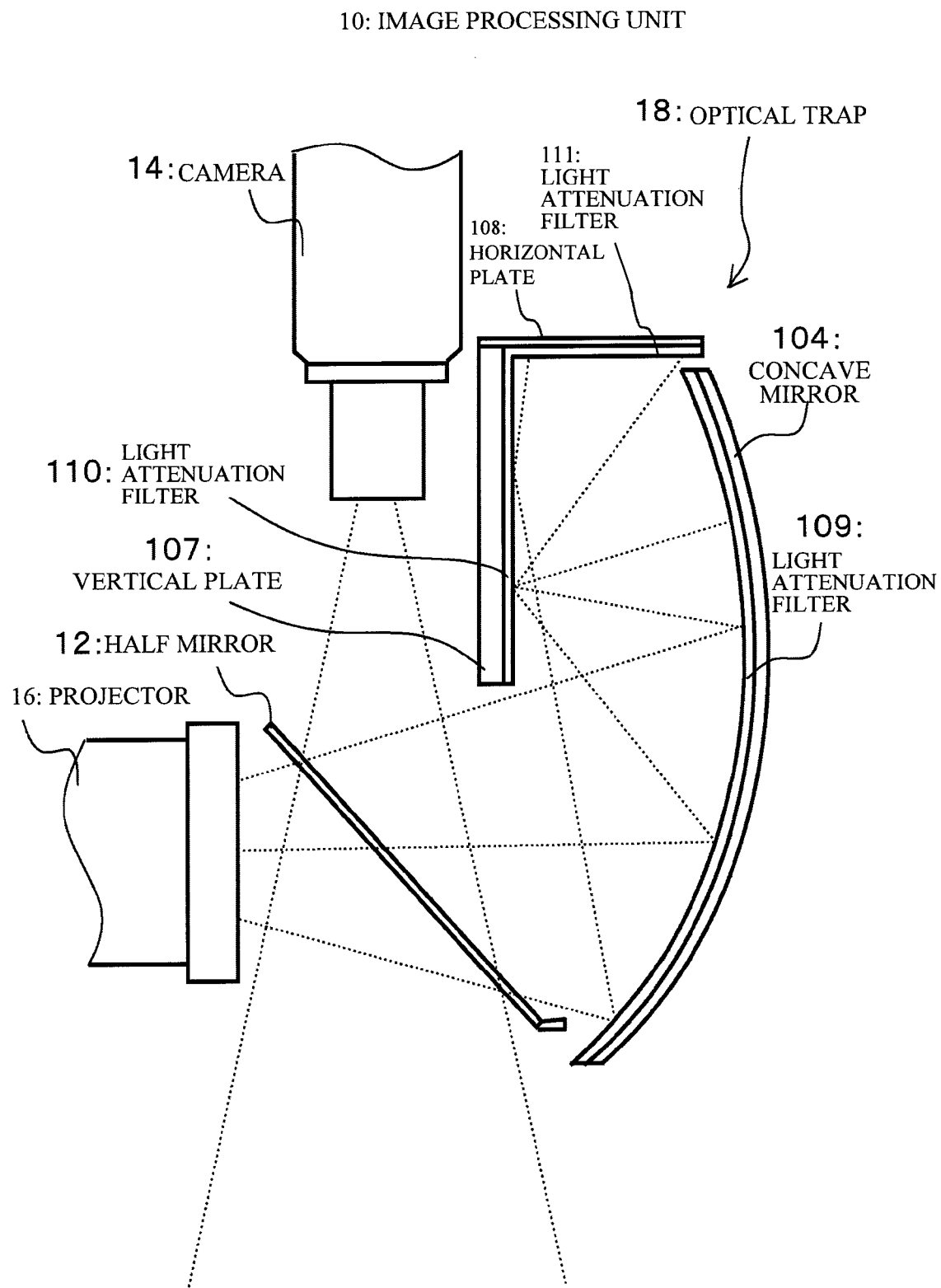
FIG. 2 shows a first specific example structure of an optical trap.
Figure 3:
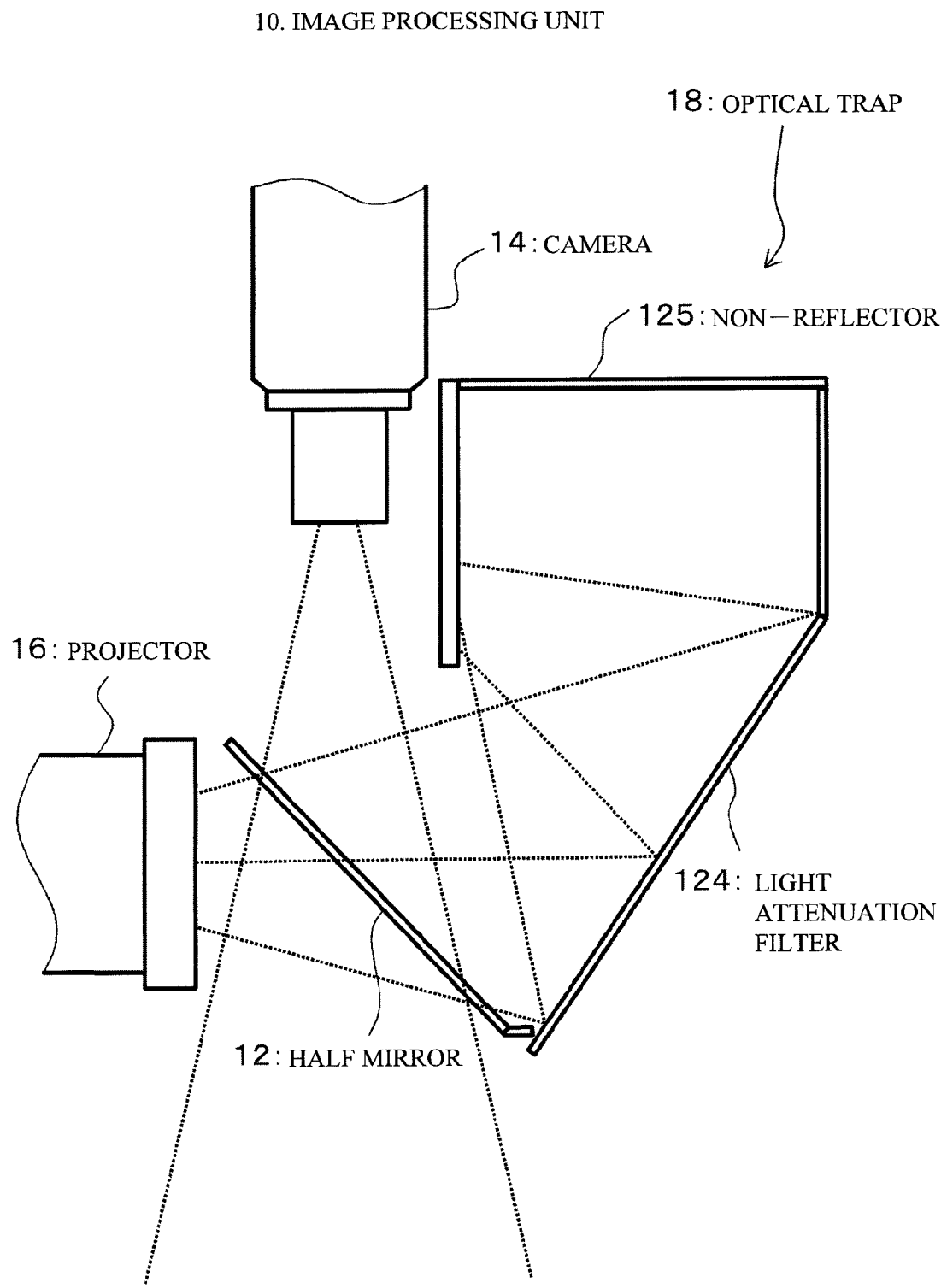
FIG. 3 shows a second specific example structure of an optical trap.

FIGS. 2 and 3 illustrate the structures of the optical traps 18 in detail. The optical trap 18 shown in FIG. 2 includes a concave mirror 104, a vertical plate 107, a horizontal plate 108, and light attenuation filters 109, 110, and 111. Imaging light passing through the half mirror 12 is reflected by the concave mirror 104. The vertical plate 107 is located in the area on which light reflected by the concave mirror 104 is focused. The horizontal plate 108 is attached to the end portion of the vertical plate 107 farther away from the half mirror 12.

The light attenuation filter 110 is formed in the vertical plate 107. The light attenuation filter 110 has a ND coat to restrain light transmission, an AR coat to restrain light reflection, and the likes. The light reflected by the concave mirror 104 is attenuated by the light attenuation filter 110, but part of the reflected light is again reflected and reaches the light attenuation filter 109 formed on the concave mirror 104. The light attenuation filter 109 has the same structure as the light attenuation filter 110. Light that reaches the light attenuation filter 109 is attenuated, but part of the light is reflected and reaches the light attenuation filter 110. Thereafter, the light reflection between the light attenuation filter 109 and the light attenuation filter 110 is repeated, so as to gradually attenuate light. The light attenuation filter 109 may be provided entirely or partially over the concave mirror 104.

On the other hand, the optical trap 18 shown in FIG. 3 includes a light attenuation filter 124 and a non-reflector 125. Imaging light passing through the half mirror 12 is attenuated by the flat-type light attenuation filter 124, but part of the imaging light is reflected by the half mirror 12. The non-reflector 125 having a section in a rectangular shape minus a side is located in the position where light reflected by the light attenuation filter enters. The non-reflector 125 absorbs the reflected light. The light receiving face of this optical trap 18 may be formed with a fabric such as velvet.

Figure 4A:
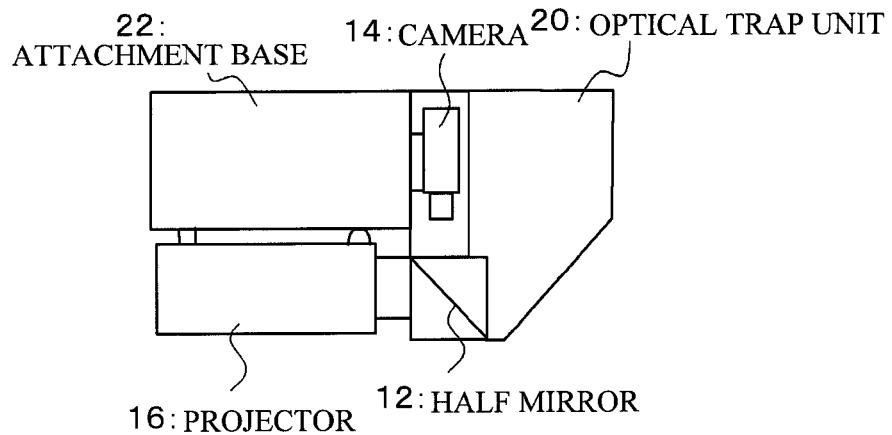
FIGS. 4A and 4B are side views of an image processing unit.
Figure 4B:
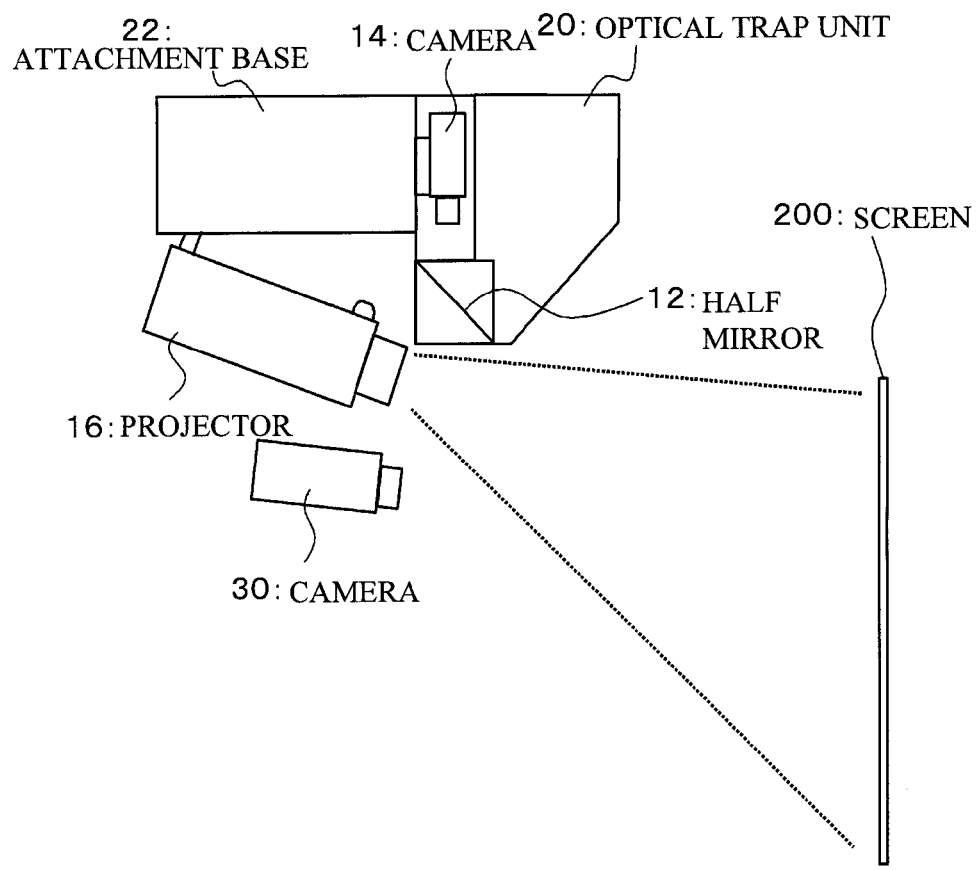

FIGS. 4A and 4B are side views of the image processing unit 10. An attachment base 22 as a first adjustment mechanism has the camera attached thereto, and the projector 16 attached thereto, with the projecting direction of the projector 16 being adjustable. The optical trap 18 is formed in an optical trap unit 20.

As the projecting direction of the projector 16 is adjustable, the direction of projecting imaging light is adjusted so that the half mirror 12 cannot exist in the projecting range, as shown in FIG. 4B. In this manner, the imaging light can be projected directly onto a screen 200.

Figure 5:
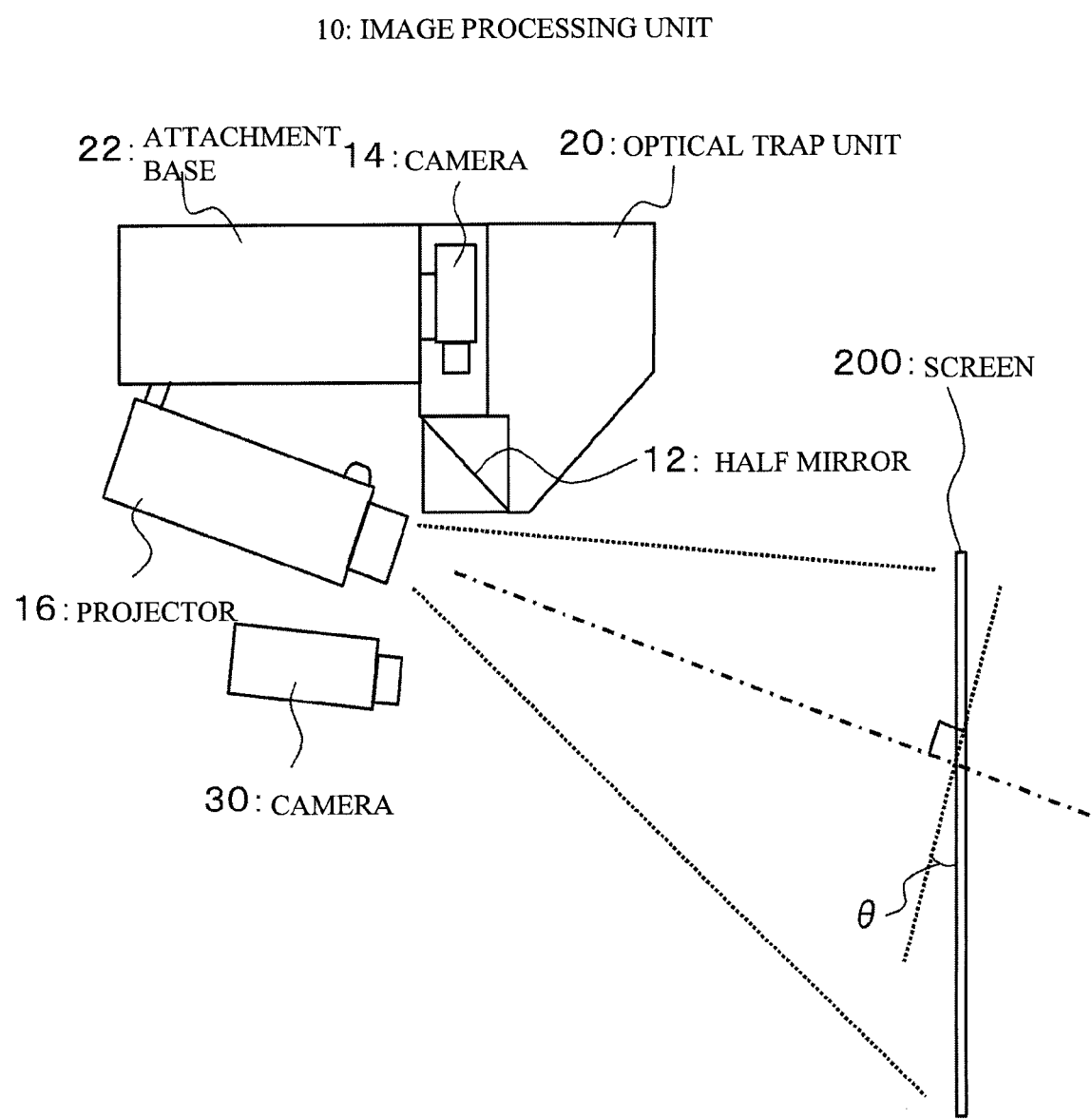
FIG. 5 shows an example of the angle of the projecting direction of the projector with respect to the projection face of the screen.

In a case where the projection face of the screen 200 extends in the vertical direction, the imaging light projecting direction of the projector 16 in the image processing unit 10 in the situation shown in FIG. 4A is perpendicular to the projection face of the screen. Accordingly, a circular luminance distribution is observed, or a so-called hot spot is formed, on the center of the projected image. However, the projector 16 is tilted as shown in FIG. 4B, so that the imaging light projecting direction of the projector 16 cannot form a right angle with respect to the projection face of the screen 200, as shown in FIG. 5. In this manner, a hot spot cannot be formed on the screen 200.

In the case where the imaging light projecting direction of the projector 16 in the image processing unit 10 is not perpendicular to the projection face of the screen 200, as shown in FIG. 5, trapezoid distortion might be caused in the image projected on the screen 200. In such a case, the projection lens (not shown) build in the projector 16 is shifted in a predetermined direction, and imaging light having the distortion corrected is projected. In this manner, the trapezoid distortion is corrected.

The tilt angle of the projector 16 is set by a personal computer (PC) or the like that controls the attachment base 22, for example. The tilt angle is input from the PC to the projector 16. Based on the tilt angle, the imaging light is corrected. Alternatively, a gyro is attached to the projector 16, and a tilt angle detected by the gyro is input to the projector 16. Based on the tilt angle, the projector 16 corrects the imaging light. In a case where trapezoid distortion is caused in the image picked up by the camera 14, the image can be corrected in the same manner as above.

A camera 30 shown in FIG. 4B picks up an image of the screen 200 having an image projected thereon through imaging light projection. If the camera 14 is designed to be movable and can pick up an image of the screen 200 having an image projected thereon, the camera 30 is unnecessary. With dust and stains on the half mirror 12 being taken into consideration, however, it is desirable to have a camera that picks up an image of the screen 200.

Figure 6:
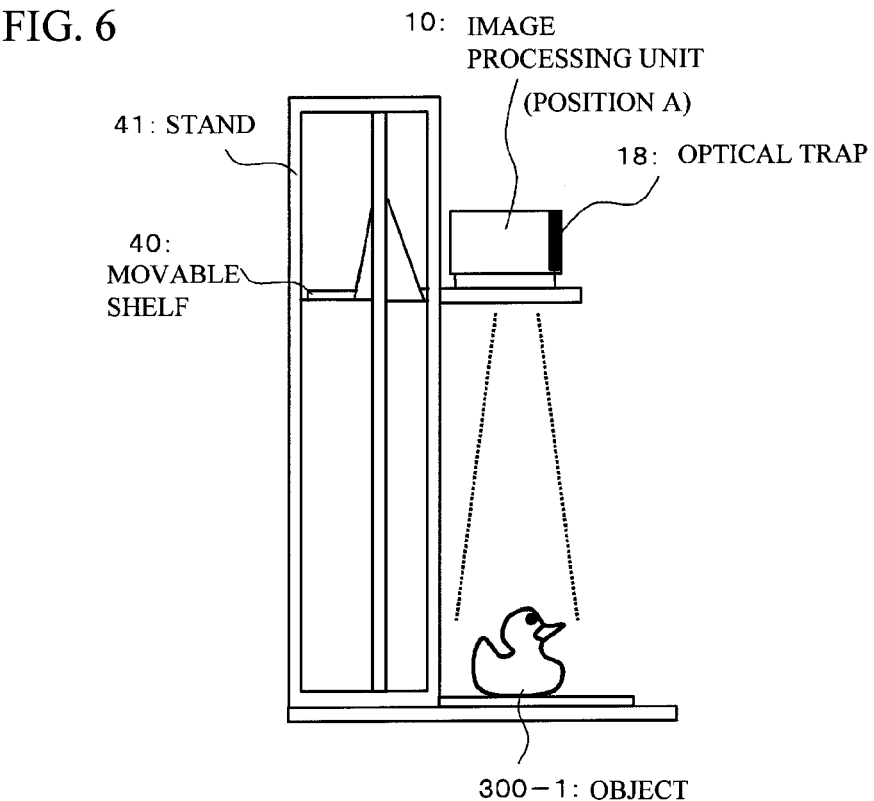
FIG. 6 is a side view of an image processing apparatus having an image processing unit above an object.
Figure 7:
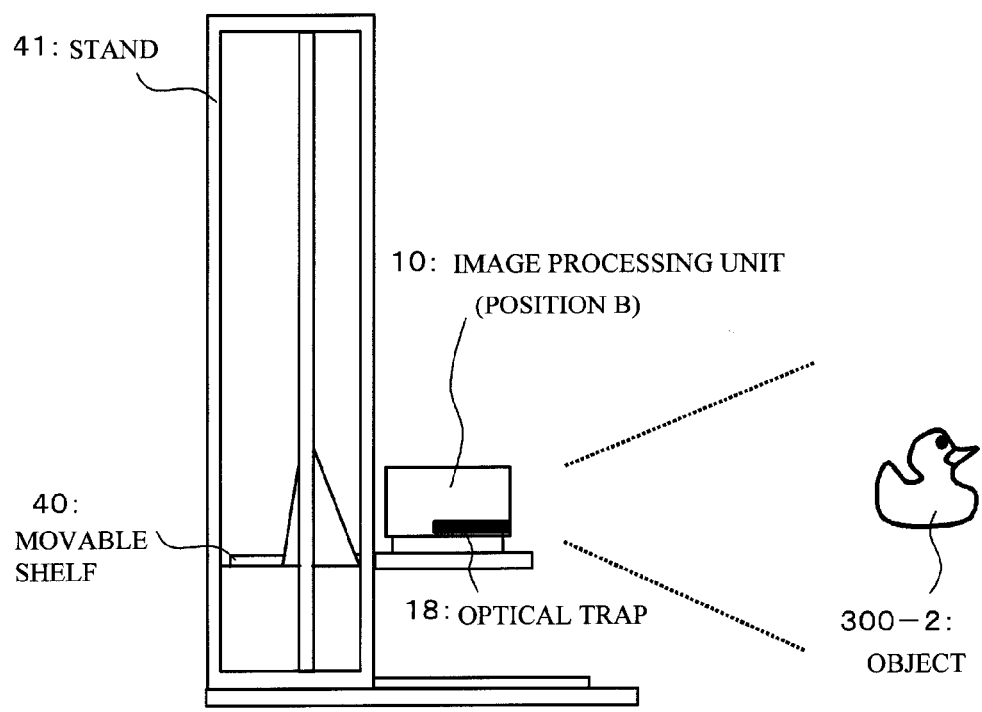
FIG. 7 is a side view of an image processing apparatus having an image processing unit placed in the same horizontal plane as an object.

FIGS. 6 and 7 are side views of a first image processing apparatus having the image processing unit 10 mounted thereon. The image processing unit 10 is placed on an elevating movable shelf 40 as a second adjustment mechanism that is slidably attached to a stand 41. In this manner, the image processing unit 10 can move up and down.

In FIG. 6, an object 300-1 is placed under the image processing unit 10 located in a position A. In this case, the optical trap 18 is placed on a side face of the image processing unit 10, or on the line extending in the projecting direction of the projector 16, as shown in FIG. 1A. The camera 14 receives the light of the object 300-1 passing through the half mirror 12, and picks up the image of the object 300-1. The imaging light from the projector 16 is reflected by the half mirror 12, and is projected downward. The movable shelf may be designed to tilt the image processing unit 10.

In FIG. 7, on the other hand, an object 300-2 is not placed under the image processing unit 10. In this case, the image processing unit 10 moves down to a position in the same horizontal plane as the object 300-2 (position B). The optical trap 18 is placed below the image processing unit 10, or on the line extending in the image pick-up direction of the camera 14, as shown in FIG. 1B. The camera 14 receives the light of the object 300-2 reflected by the half mirror 12, and picks up the image of the object 300-2. The imaging light from the projector 16 passes through the half mirror 12, and is projected in the horizontal direction.

Figure 8:
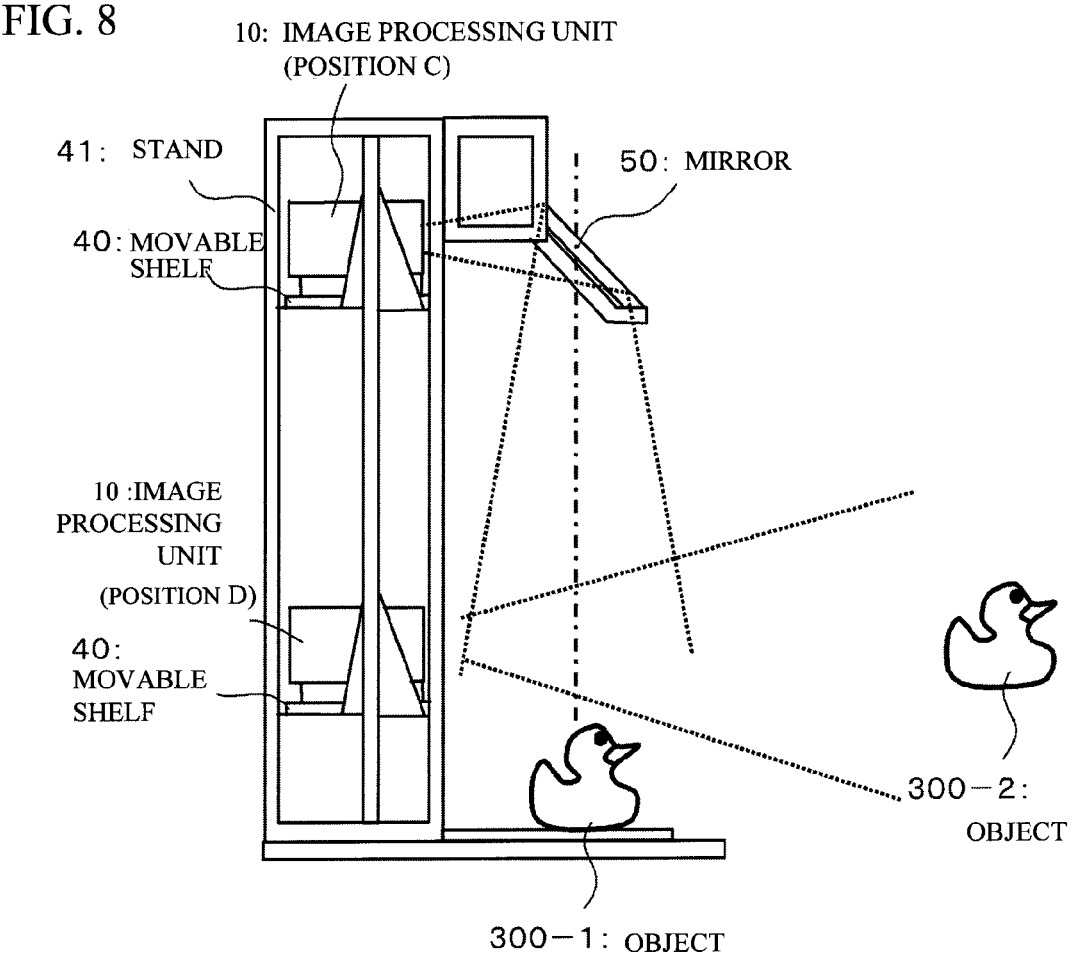
FIG. 8 is a side view of an image processing apparatus having a mirror placed on the line extending in the projecting direction of the projector of the image processing unit.
Figure 9:
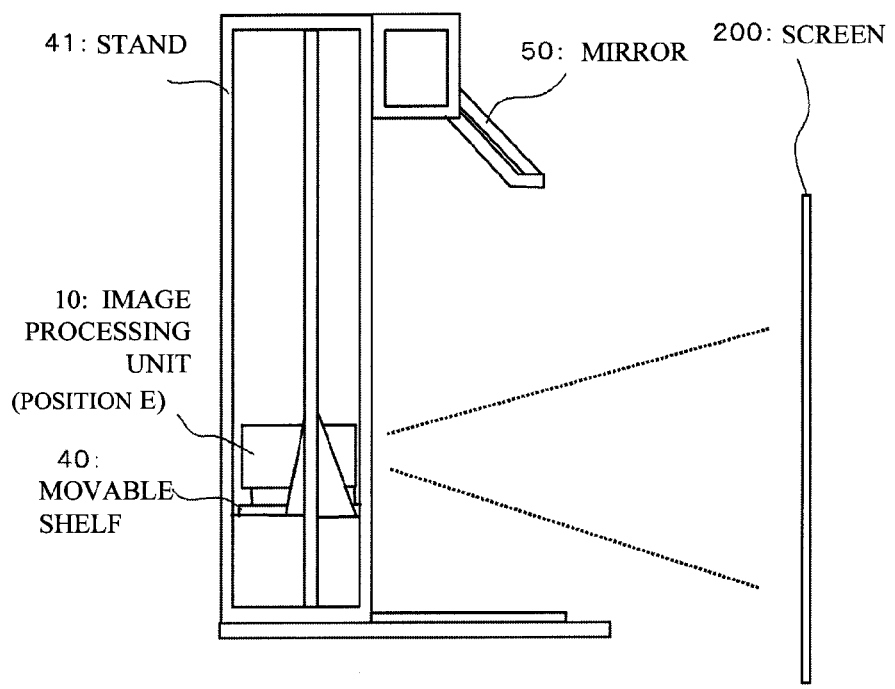
FIG. 9 is a side view of an image processing apparatus in which the projecting direction of the projector is horizontal, and the image processing unit is placed in such a position that the screen exists on the line extending in the projecting direction.
Figure 10:
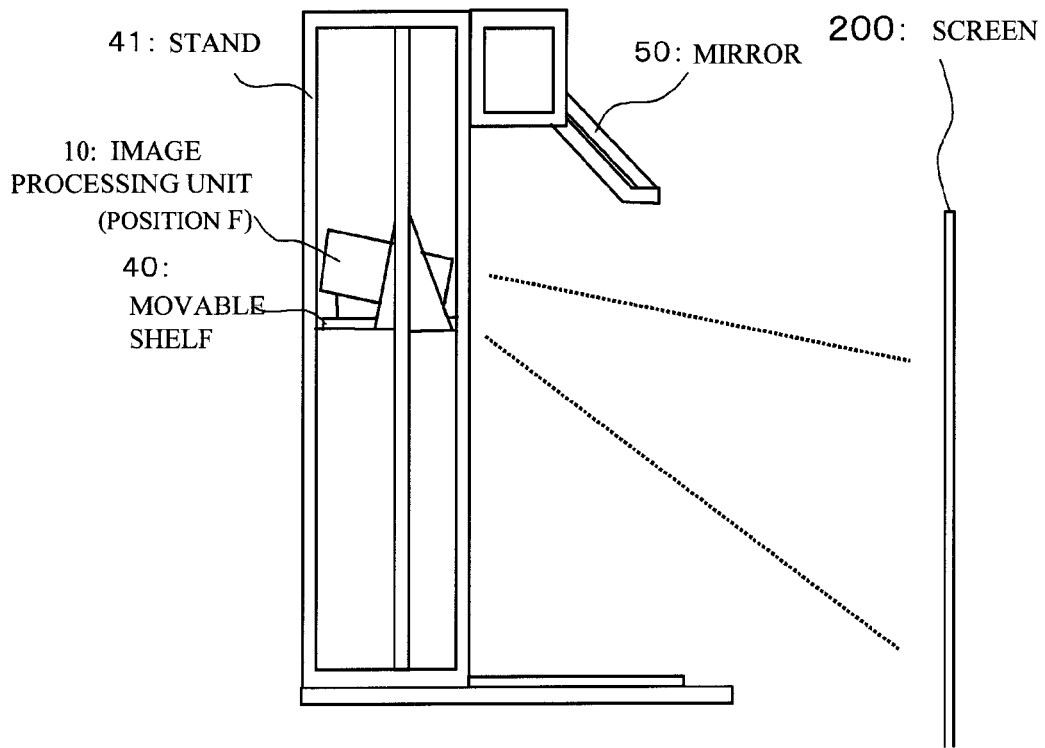
FIG. 10 is a side view of an image processing apparatus in which the projector projects light diagonally downward, and the image processing unit is placed in such a position that the screen exists on the line extending in the projecting direction.

FIGS. 8, 9, and 10 are side views of a second image processing apparatus having the image processing unit 10 mounted thereon. As in the first image processing apparatus, the image processing unit 10 is placed on the movable shelf 40, and can move up and down. In a case where the image processing unit 10 is located in a position C, a mirror 50 as a reflecting means is provided on the line extending in the projecting direction of the projector 16.

In the case where the image processing unit 10 is located in the position C as shown in FIG. 8, the optical trap 18 is placed under the image processing unit 10, or on the line extending in the image pick-up direction of the camera 14, as shown in FIG. 1B. The camera 14 receives the light of the object 300-1 that is reflected by the mirror 50 and passes through the half mirror 12. The camera 14 then picks up the image of the object 300-1. In a case where the image processing unit is located in a position D, the optical trap 18 is placed on a side face of the image processing unit 10, or on the line extending in the projecting direction of the projector 16. The camera 14 receives the light of the object 300-2 reflected by the half mirror 12, and picks up the image of the object 300-2.

In FIG. 9, the image processing unit 10 is located in a position E. In this case, the optical trap 18 is placed under the image processing unit 10, or on the line extending in the image pick-up direction of the camera 14, as shown in FIG. 1B. The imaging light from the projector 16 passes through the half mirror 12, and is horizontally projected onto the screen 200.

In FIG. 10, the image processing unit 10 is located in a position F. This image processing unit 10 is tilted so that imaging light that is emitted from the projector 16 and passes through the half mirror 12 is projected diagonally downward. In this case, the optical trap 18 is placed under the image processing unit 10, or on the line extending in the image pick-up direction of the camera 14, as shown in FIG. 1B. The imaging light from the projector 16 passes through the half mirror 12, and is projected diagonally downward. In this manner, the imaging light is projected onto the screen 200.

Figure 11:
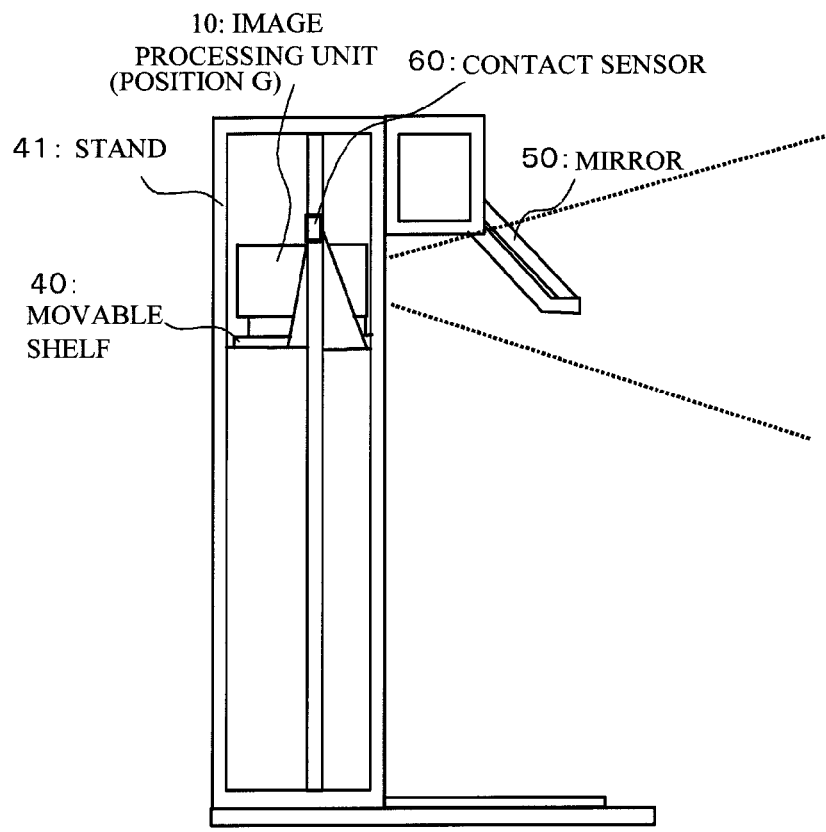
FIG. 11 is a side view of an image processing apparatus having the image processing unit located in such a position that a mirror exists in the image pick-up range of the camera.

FIG. 11 is a side view of a third image processing apparatus having the image processing unit 10 mounted thereon. Unlike the second image processing apparatus, the third image processing apparatus has a contact sensor 60 that detects the location of the image processing unit 10 placed on the movable shelf 40. More specifically, in a case where the image processing unit 10 is located in such a position that the mirror 50 exists in the image pick-up range of the camera 14, the contact sensor 60 is located in such a position that can be brought into contact with the image processing unit 10.

In the situation shown in FIG. 11, when the contact sensor 60 is brought into contact with the image processing unit 10 located in a position G, a detection signal to this effect is sent to the projector 16. When the projector 16 receives the detection signal, or when the mirror 50 exists in the image pick-up range of the camera 14, the projector 16 mirror-reverses the image picked up by the camera 14, and projects the imaging light corresponding to the mirror-reversed image. In this manner, a non-reversed image is projected on the screen. If the detection signal is not received by the projector 16, or if the mirror 50 does not exist in the image pick-up range of the camera 14, the projector 16 projects the imaging light corresponding to the image picked up by the camera 14.

Figure 12:
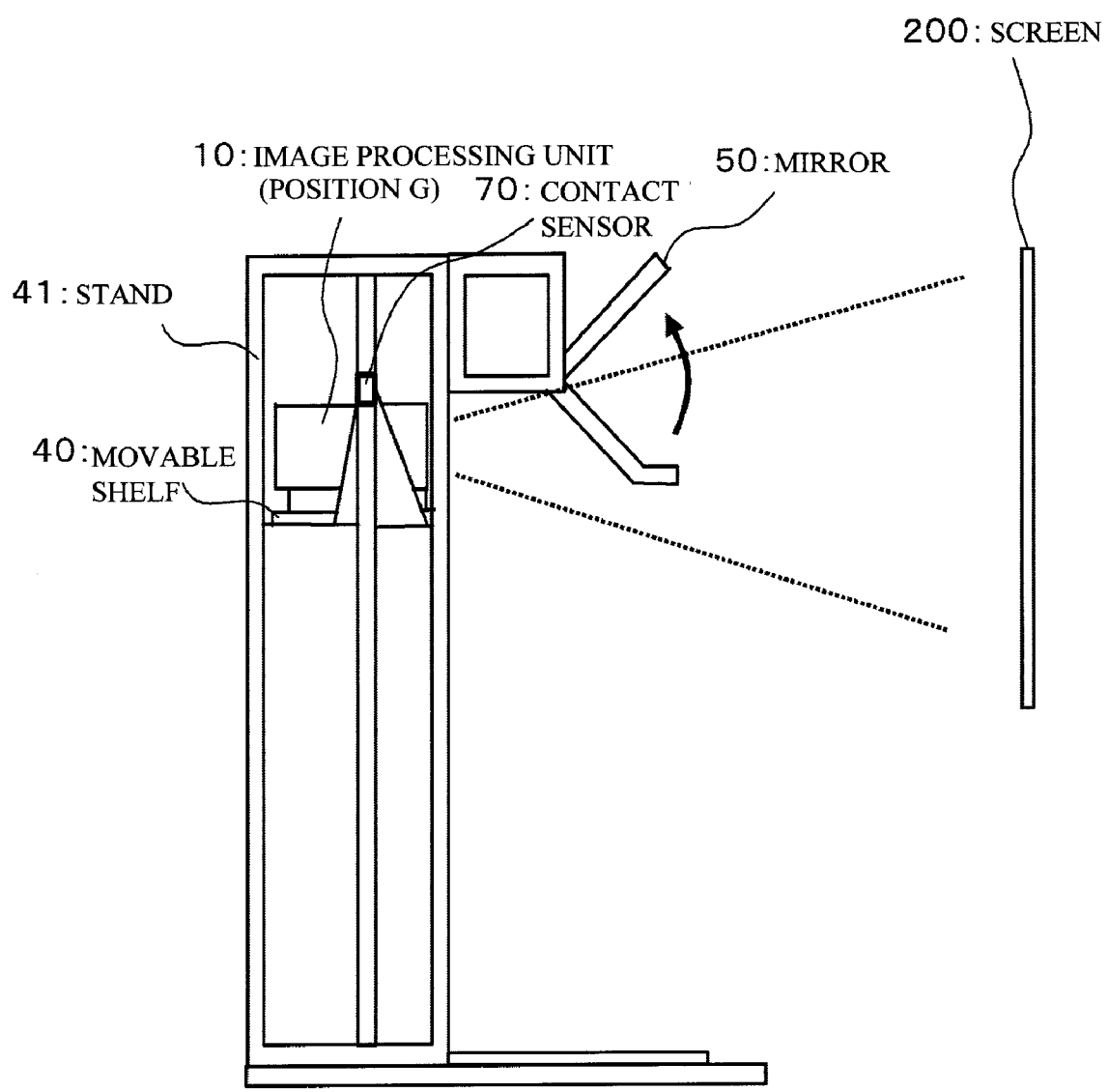
FIG. 12 is a side view of an image processing apparatus in which the mirror is eliminated from the image pick-up range of the camera.

FIG. 12 is a side view of a fourth image processing apparatus having the image processing unit 10 mounted thereon. Unlike the second image processing apparatus, the fourth image processing apparatus has the mirror 50 that can be flipped up, and a contact sensor 70 that detects the location of the image processing unit 10 placed on the movable shelf 40. More specifically, in a case where the image processing unit 10 is located in such a position that the mirror 50 exists in the imaging light projecting range of the projector 16, the contact sensor 70 is placed in such a position that can be brought into contact with the image processing unit 10.

In the situation shown in FIG. 12, when the contact sensor 70 is brought into contact with the image processing unit 10 located in the position G, a detection signal to this effect is sent to the projector 16. When the projector 16 receives the detection signal, or when the mirror 50 exists in the imaging light projecting range of the projector 16, the projector 16 stops projecting the imaging light. Alternatively, when the projector 16 receives the detection signal, the projector 16 performs a control operation to flip up the mirror 50, and thus eliminates the mirror 50 from the imaging light projecting range of the projector 16. The mirror 50 might be flipped up by hand.

As described above, in the image processing apparatus employed in this exemplary embodiment, the imaging light projecting direction of the projector 16 of the image processing unit 10 is restricted. As a result, even when the image pick-up direction of the camera 14 is restricted, the camera 14 can pick up an image of the object, receiving the light passing through the half mirror 12 or the light reflected by the half mirror 12. Accordingly, the camera 14 has two image pick-up directions, and a greater degree of freedom is allowed in the image pick-up.

Also, by virtue of the movable optical trap 18, light unnecessary for image pick-up cannot reach the camera 14, and an image of the object 300 can be properly picked up.

Further, since the imaging light projecting direction of the projector 16 can be adjusted, the half mirror 12 can be eliminated from the projecting range. In this manner, an image can be projected directly on the screen 200. Also, since the position and the setting angle of the image processing unit 10 are adjustable in the vertical direction, the positional relationship between the image processing unit 10 and the object 300 can be set suitably for picking up an image of the object and projecting the imaging light.

In the above described exemplary embodiment, in a case where the image processing unit 10 is located in such a position that the mirror 50 exists in the image pick-up range of the camera 14, the image picked up by the camera 14 is mirror-reversed. In a case where the image processing unit 10 is located in such a position that the mirror 50 exists in the imaging light projecting range of the projector 16, the projection of imaging light from the projector 16 is stopped, or the mirror 50 is flipped up. However, it is also possible to restrict the location of the image processing unit 10, so that the image processing unit 10 cannot move to such a position that the mirror 50 enters the image pick-up range of the camera 14 or the imaging light projecting range of the projector 16, or that the image processing unit 10 cannot stand still in such positions.

Although the image processing unit 10 is placed on the movable shelf 40 slidably attached to the stand 41 in the above described exemplary embodiment, the image processing unit 10 may be mounted on a horizontal surface of a table, a floor, or a box-like base, or may be attached to a vertical face such as the face of a wall. Alternatively, the image processing unit 10 may be attached to a ceiling.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

CROSS-REFERENCE TO RELATED APPLICATIONS

This application is based on and claims priority under 35 USC 119 from Japanese Patent Application No. 2006-217508 filed Aug. 9, 2006.

What is claimed is:

1. An image processing apparatus comprising:
a first image pick-up unit;
a projecting unit that projects imaging light;
an optical unit that transmits part of light entering from a first image pick-up direction and guides the part of the light to the first image pick-up unit while reflecting part of the imaging light projected from the projecting unit and outputting the reflected light in the first image pick-up direction, and reflects part of light entering from a second image pick-up direction and guides the part of the light to the first image pick-up unit while transmitting part of the imaging light projected from the projecting unit and outputting the part of the imaging light in the second image pick-up direction; and
an attenuating unit that is movably placed between a first position in which imaging light transmitted through the optical unit can be received and a second position in which imaging light reflected by the optical unit can be received, and attenuates the received imaging light.

2. The image processing apparatus according to claim 1, further comprising a casing that shields the first image pick-up unit, at least an optical system of the projecting unit, and the optical unit, wherein:
the casing has a first light incoming/outgoing unit that receives light from the first image pick-up direction and emits part of the imaging light projected by the projecting unit, and a second light incoming/outgoing unit that receives light from the second image pick-up direction and emits part of the imaging light projected by the projecting unit; and
the attenuating unit is designed to selectively shield the first and second light incoming/outgoing unit.

3. The image processing apparatus according to claim 1, further comprising a first adjustment mechanism that adjusts a direction of the imaging light projected by the projecting unit.

4. The image processing apparatus according to claim 1, further comprising a second image pick-up unit that picks up an image of a predetermined display region on which an image is projected through the imaging light projected by the projecting unit.

5. The image processing apparatus according to claim 1, comprising:
an image processing unit that is formed with the first image pick-up unit, the projecting unit, the optical unit, and the attenuating unit; and
a second adjustment mechanism that adjusts at least one of a position and a set angle of the image processing unit.

6. The image processing apparatus according to claim 5, further comprising a reflecting unit that is placed in a position within an image pick-up range of the first image pick-up unit, when the image processing unit is located in a predetermined position through the position adjustment by the second adjustment mechanism.

7. The image processing apparatus according to claim 6, further comprising a detecting unit that detects the position of the image processing unit.

8. The image processing apparatus according to claim 7, wherein the projecting unit projects imaging light corresponding to an image obtained by reversing an image picked up by the first image pick-up unit, when the position of the image processing unit detected by the detecting unit is such a position that the reflecting unit exists in the image pick-up range of the first image pick-up unit.

9. The image processing apparatus according to claim 7, wherein the projecting unit stops the projection of the imaging light, when the position of the image processing unit detected by the detecting unit is such a position that the reflecting unit exists in an imaging light projecting range of the projecting unit.

10. The image processing apparatus according to claim 8, further comprising an elimination mechanism that eliminates the reflecting unit from the imaging light projecting range of the projecting unit, when the position of the image processing unit detected by the detecting unit is such a position that the reflecting unit exists in the imaging light projecting range of the projecting unit.

11. The image processing apparatus according to claim 5, wherein the image processing unit is attached to a ceiling.

12. The image processing apparatus according to claim 5, wherein the image processing unit is slidably attached to a stand.

13. The image processing unit according to claim 1, wherein an optical axis of the first image pick-up unit is not parallel to an optical axis of the projecting unit.

14. The image processing unit according to claim 1, wherein the attenuating unit is disposed on the optical axis of the projector in the first position and is disposed on the optical axis of the first image pick-up unit in the second position.

15. The image processing unit according to claim 13, wherein the attenuating unit is disposed on the optical axis of the projector in the first position and is disposed on the optical axis of the first image pick-up unit in the second position.

16. The image processing unit according to claim 1, wherein a surface of the attenuating unit that receives the imaging light is reflective.

17. The image processing unit according to claim 1, wherein a surface of the attenuating unit that receives the imaging light is absorptive so as to not transmit or reflect the imaging light.

* * * * *